No. 855,360.  
PATENTED MAY 28, 1907.  
M. L. SWINGLE.  
HORSE RELEASER.  
APPLICATION FILED MAR. 6, 1907.
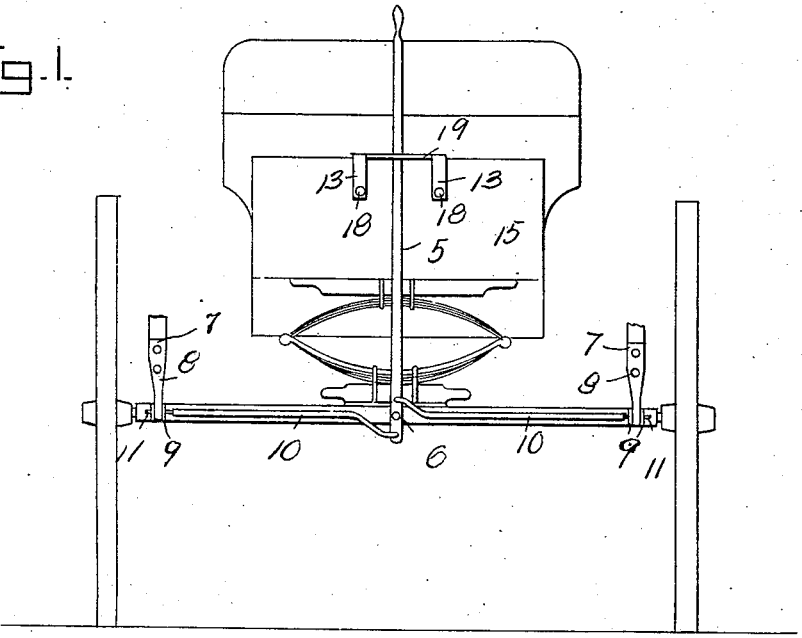
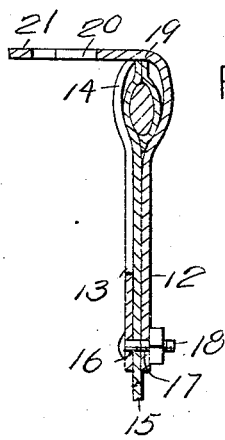
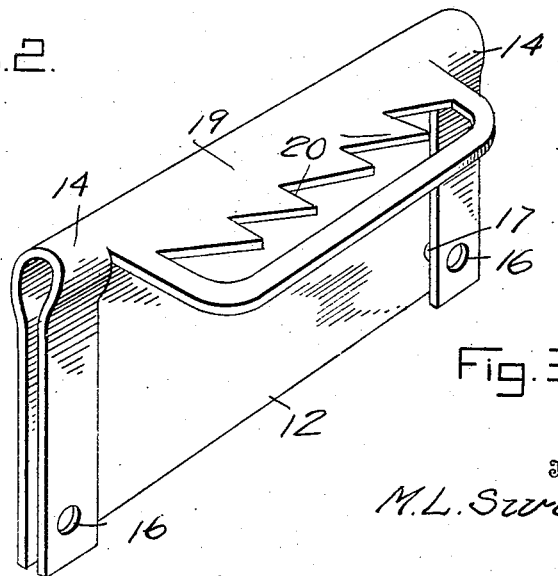
Witnesses  
C. R. Thomas  
G. G. Smith
Inventor  
M. L. Swingle  
By Chandler & Chandler  
Attorneys

UNITED STATES PATENT OFFICE.

MARTIN L. SWINGLE, OF ROSEVILLE, OHIO.

HORSE-RELEASER.

No. 855,360.  Specification of Letters Patent.  Patented May 28, 1907.

Application filed March 6, 1907. Serial No. 360,882.

*To all whom it may concern:*

Be it known that I, MARTIN L. SWINGLE, a citizen of the United States, residing at Roseville, in the county of Muskingum, State of Ohio, have invented certain new and useful Improvements in Horse-Releasers; and I do hereby declare the following to be a full, clear, and exact description of the invention, such as will enable others skilled in the art to which it appertains to make and use the same.

This invention relates to horse releasers and more particularly to that class which are so constructed as to release the shafts from the vehicle.

The primary object of the invention is to provide a simple device of this class which may be readily applied to the dash-board of any of the ordinary forms of vehicles now in use and to provide a novel form of rack element for holding the operating lever of the releaser in inoperative position.

In the accompanying drawings, Figure 1 is a front elevation of a buggy or similar vehicle showing the application of my invention, Fig. 2 is a vertical sectional view in detail through the rack member for the lever and showing the manner of engaging the lever therewith, and, Fig. 3 is a detail perspective view of the rack member moved from the dash-board.

Referring more specifically to the drawings the numeral 5 denotes a lever which is pivoted as at 6 adjacent its lower end to the vehicle axle. The shafts of the vehicle are indicated by the numeral 7 and are provided with the usual thill irons 8 which are adapted for engagement with the usual clips 9 carried by the axle. Pivotally connected with the lever 5 above and below its pivot point 6 are bolt rods 10 each of which is reduced at its outer end as at 11 and is adapted for engagement in the registering openings formed in the clip and in the thill irons.

In order to hold the lever 5 in position to maintain the ends of the rods 10 in engagement in the openings as above stated, I have provided a rack member. This rack member comprises a plate 12 which is stamped to form tongues 13 at its ends which tongues are bent over upon the body of the plate as at 14 and as the plate is formed of resilient sheet metal, the dash-board will be firmly clipped between the tongues and the body of the plate. Each of these tongues 13 is provided with a bolt opening 16 and these openings aline with the openings 17 formed in the body portion of the plate, there being bolts 18 engaged through the said openings 16 and 17 and the dash-board so as to secure the rack member upon the dash-board.

That portion of the plate 12 which extends between the tongues 13, is extended forwardly over the upper edge of the dash-board as indicated by the numeral 19 and this portion of the plate is stamped out to form rack teeth 20 and a guard portion 21 which extends in a common plane with the teeth and directly in advance with the forward edges thereof.

From the foregoing description of my invention it will be observed that the lever 5 may be engaged with the teeth 20 to hold the lever in position to retain the connection between the shaft and the vehicle and that it may be released when it is desired to release the shafts.

What is claimed is—

The combination with a vehicle axle and a thill adapted for connection therewith, of a lever pivoted upon the axle, bolt rods pivotally connected with the lever, and a rack carried by the dash-board of the vehicle for co-operation with the lever, said rack comprising a plate formed of resilient sheet metal bent for frictional engagement over the upper edge of the dash-board, said plate having a portion extending forwardly above the upper edge of the dash-board and stamped up to form rack teeth for the engagement of the lever and a guard member which is located in a common plane with the teeth and extends in advance of the same.

In testimony, whereof I affix my signature, in presence of two witnesses.

M. L. SWINGLE.

Witnesses:
J. N. OWENS,
C. E. PORTER.